US009100105B2

(12) United States Patent
Yamamoto et al.

(10) Patent No.: US 9,100,105 B2
(45) Date of Patent: Aug. 4, 2015

(54) SPLITTER

(75) Inventors: Yasuko Yamamoto, Osaka (JP); Mitsuru Tanabe, Osaka (JP); Mitsuru Maeda, Osaka (JP); Kenji Kuniyoshi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 34 days.

(21) Appl. No.: 14/237,591

(22) PCT Filed: Aug. 10, 2012

(86) PCT No.: PCT/JP2012/070543
§ 371 (c)(1),
(2), (4) Date: Feb. 7, 2014

(87) PCT Pub. No.: WO2013/022098
PCT Pub. Date: Feb. 14, 2013

(65) Prior Publication Data
US 2014/0192907 A1   Jul. 10, 2014

(30) Foreign Application Priority Data
Aug. 11, 2011   (JP) .................................. 2011-176244

(51) Int. Cl.
*H04B 3/00*   (2006.01)
*H04L 25/00*   (2006.01)
(Continued)

(52) U.S. Cl.
CPC .. *H04B 3/56* (2013.01); *H04B 3/54* (2013.01); *H04B 2203/5425* (2013.01); *H04B 2203/5483* (2013.01); *H04B 2203/5491* (2013.01)

(58) Field of Classification Search
CPC ............ H04B 3/54; H04B 3/542; H04B 3/56; H04B 2203/5425; H04B 2203/5483; H04B 2203/5491; H04L 25/0278

USPC .......................................................... 375/257
See application file for complete search history.

(56) References Cited

U.S. PATENT DOCUMENTS

2003/0095036 A1* 5/2003 Wasaki et al. ............ 340/310.01
2012/0086517 A1* 4/2012 Urabe .......................... 333/17.3

FOREIGN PATENT DOCUMENTS

JP   2007-166109 A   6/2007
JP      3969451 B2    6/2007
(Continued)

OTHER PUBLICATIONS

International Search Report for corresponding International Application No. PCT/JP2012/070543 mailed Sep. 4, 2012 and English translation.

(Continued)

*Primary Examiner* — David B. Lugo
(74) *Attorney, Agent, or Firm* — Renner, Otto, Boisselle & Sklar, LLP

(57) ABSTRACT

A splitter includes, in parallel between trunk terminals and branch terminals, a signal branching circuit that blocks distributed power and passes a PLC communication signal and a power branching circuit that blocks the communication signal and passes the distributed power. In the signal branching circuit, impedance viewed from the branch terminal side is matched with characteristic impedance of a power line and impedance viewed from the trunk terminal side is higher than impedance viewed from the branch terminal side, in the frequency band of the communication signal. In the power branching circuit, input/output impedance is set to be sufficiently higher than the impedance of the signal branching circuit viewed from the trunk terminal side, in the frequency band of the communication signal.

3 Claims, 4 Drawing Sheets

(51) Int. Cl.
*H04B 3/56* (2006.01)
*H04B 3/54* (2006.01)

(56) References Cited

FOREIGN PATENT DOCUMENTS

| JP | 2007-174547 A | 7/2007 |
|---|---|---|
| JP | 2007-189451 A | 7/2007 |
| JP | 2008-228022 A | 9/2008 |
| JP | 4284317 B2 | 3/2009 |
| JP | 2009-178028 A | 8/2009 |
| JP | 2009-272963 A | 11/2009 |
| JP | 2011-082601 A | 4/2011 |
| JP | 4838838 B2 | 10/2011 |

OTHER PUBLICATIONS

PCT/ISA/237 (Written Opinion) for corresponding International Application No. PCT/JP2012/070543 mailed Sep. 4, 2012.
Terashima et al., "Study of Home-Network using the In-door power line: Characteristic improvement by many branches", Institute of Electronics, Information and Communication Engineers Technical Report, Jun. 11, 2010, vol. 110, No. 84, pp. 61-66 with partial English translation.
Yoshinaga et al., "Study of Home-LAN using the In-door power line", The Institute of Electronics, Information, and Communication Engineers, Mar. 7, 2007, p. 351-352 with partial English translation.
"Coil no Kiso 5", Denki Denshi no Kiso Chishiki Dai 86 Kai, OKA Kogakuin, [on line], Jul. 2011, [retrieval date Aug. 24, 2012], Internet http://sky.geocities.jp/fxjpt193/denki/denkibuhin/denki086.pdf with partial English translation of "Electic and electronics basic knowledge", The $86^{th}$, Base of coil: section 5.
"Tsushin Port no Dendo Noise Sokutei, Trans Buhin no Heikodo Hyoka )Common Mode Denryu Sokutei)", Denshi Kiki no EMC Tokusei Hyoka Kaiseki Gijutsu no Kodoka ni Kansuru Manual (Heisei 22 Nendo revised edition), [online], Yamaguchi Prefectural Industrial Technology Institute, 2010, [retrieval date Aug. 24, 2012], internet http://unit/aist.go.jp/chugoku/innovation/emc/yamaguchi/manual-hontai.pdf with partial English translation of Measurement of transmission noise in a communication port and equilibrium evalutation of noise suppression devices (measurement of common-mode current).

* cited by examiner

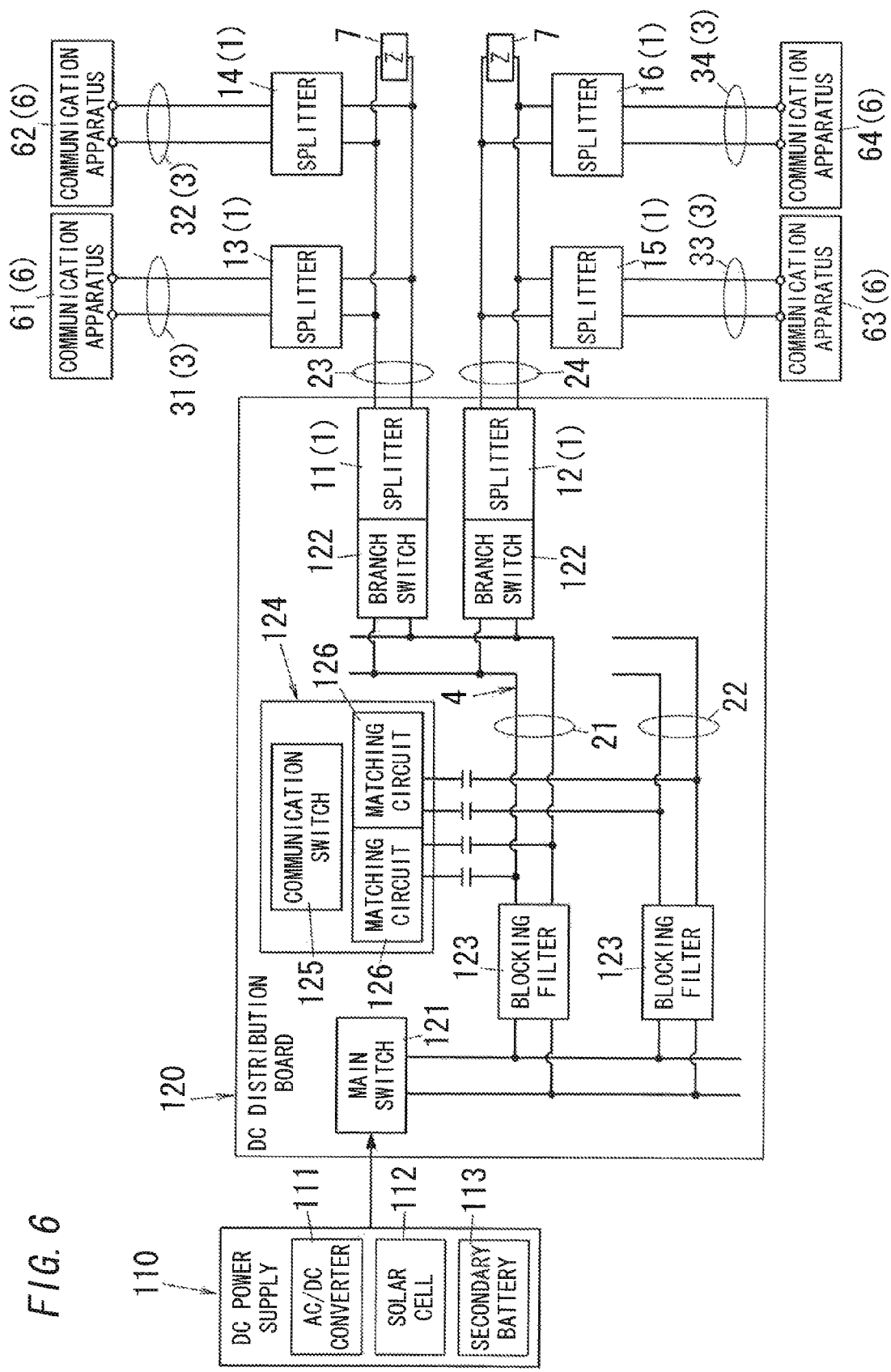

SPLITTER

TECHNICAL FIELD

This invention relates to a splitter for branching a communication signal.

BACKGROUND ART

Conventionally, in the field of communication, power line communication (PLC) technology is known in which a communication signal in a predetermined frequency band is transmitted superimposed on distributed power using a power line as a transmission line. PLC is attracting attention as technology that enables easy construction of a network because there is no need to provide a dedicated communication line separately from the power line, since the power line for supplying electric power is also used as the transmission line for communication apparatuses to communicate with each other. Note that, in a case where the power line is a power line for AC power distribution, the frequency band of the communication signal is set to a frequency band that is sufficiently higher than the frequency of the AC power that is supplied through the power line.

Incidentally, a power line that is wired to a building or the like normally is not assumed to have a PLC communication signal superimposed thereon, and is simply branched to branch lines from a trunk line using a joint box or the like. Thus, with the PLC communication signal, signal reflection and loss occur at branch points from the trunk line to the branch lines in the power line, possibly leading to a deterioration in communication quality.

As a technique to improve the communication quality of PLC, a technique is proposed in which filter circuits (filter devices) are provided at vicinities (or at branch points) of the branch points from the trunk line to the branch lines (see Patent Document 1: Japanese Patent No. 4284317 and Patent Document 2: Japanese Patent No. 3969451). With the configuration described in Patent Document 1, the filter circuits are provided only at some branch lines to which the PLC communication apparatuses are not connected among the branch lines, and as a result noise and impedance caused by branch lines that are not engaged in communication and electrical apparatuses connected to branch lines that are not engaged in communication are prevented from affecting the PLC communication. The filter device described in Patent Document 2 activates filter processing by a noise filter when an electrical apparatus such as an inverter apparatus or an electric drill is connected to the power line, and as a result noise emitted from the electric apparatuses to the power line is reduced.

However, the noise filters (filter circuits) described in Patent Documents 1 and 2, while being able to reduce reflection of a communication signal at an open end and noise emitted from an electric apparatus, cannot function in branch lines to which PLC communication apparatuses are connected, since these noise filters do not pass the PLC communication signal. Thus, even if these noise filters (filter circuits) are used, reflection or loss of the communication signal at the branch points from the trunk line to the branch lines in the power line cannot be reduced. Note that with the filter circuit described in Patent Document 1, the connection location needs to be changed depending on which branch line the communication apparatus is connected to. However, it is difficult for a general user to take measures to change the connection location of the filter circuit.

SUMMARY OF INVENTION

The present invention has been made in view of the above-described problems, and an object of the present invention is to provide a splitter that can prevent the intensity of a communication signal from decreasing considerably at branch points from a trunk line to branch lines in a power line and ensure robust communication.

A splitter of the present invention is used for power line communication in which a power line is used as a transmission line, the power line including a trunk line and a plurality of branch lines that branch from the trunk line, and a communication signal in a predetermined frequency band is transmitted superimposed on distributed power, the splitter being inserted between the trunk line and each of the plurality of branch lines, and the splitter being provided with a trunk terminal that is connected to the trunk line and a branch terminal that is connected to a branch line. The splitter includes a signal branching circuit configured to block the distributed power and pass the communication signal and a power branching circuit configured to block the communication signal and pass the distributed power, parallely between the trunk terminal and the branch terminal.

According to the invention, there is an advantage in that considerable lowering of intensity of the communication signal at each branch point from the trunk line to the branch line in the power line can be prevented and robust communication can be ensured.

In this splitter, it is desirable that, in the signal branching circuit, in a frequency band of the communication signal, impedance viewed from the branch terminal side is set to match characteristic impedance of the power line, and impedance viewed from the trunk terminal side is set to impedance that is higher than the characteristic impedance of the power line and is set in accordance with a number of branches from the trunk line to the branch lines such that the communication signal is distributed with an intensity equal to or higher than a specified value from the trunk line to all the plurality of branch lines.

In this splitter, it is more desirable that the power branching circuit is configured by differential mode choke coils.

In this splitter, it is more desirable that a pair of trunk terminals and a pair of branch terminals are provided, and the power branching circuit is configured by a low-pass filter that includes a pair of differential mode choke coils that are serially inserted between the trunk terminals and the branch terminals and a capacitor that is inserted between the pair of trunk terminals at a pair of connecting points of the choke coils.

BRIEF DESCRIPTION OF DRAWINGS

FIG. 6 is a system configuration diagram of a power distribution system that uses a splitter according to Embodiment 2.

DESCRIPTION OF EMBODIMENTS

In the following embodiments, a splitter will be described that is used in power line communication (PLC) in which a communication signal in a predetermined frequency band is transmitted on a power line as a transmission line, in a power distribution system in which electric power is delivered to an interior of a residence with a power line laid in a residence or the like. Since the power line for electric power supply is also used as the transmission line for PLC communication apparatuses to communicate, there is no need to provide a dedicated communication line separately from the power line.

Embodiment 1

In the present embodiment, a case where, in an AC power distribution system in which AC power is distributed to an interior of a residence or the like as the distributed power, PLC communication apparatuses communicate by communication signals that are superimposed on the AC power distributed through a power line will be described as an example. A frequency band of the communication signal is set to a frequency band (10 kHz-450 kHz or 2 MHz-30 MHz, for example) in which a frequency that is sufficiently higher than the frequency (50 Hz or 60 Hz) of the AC power (commercial power) distributed through the power line is set as a lower limit.

Figure 2:
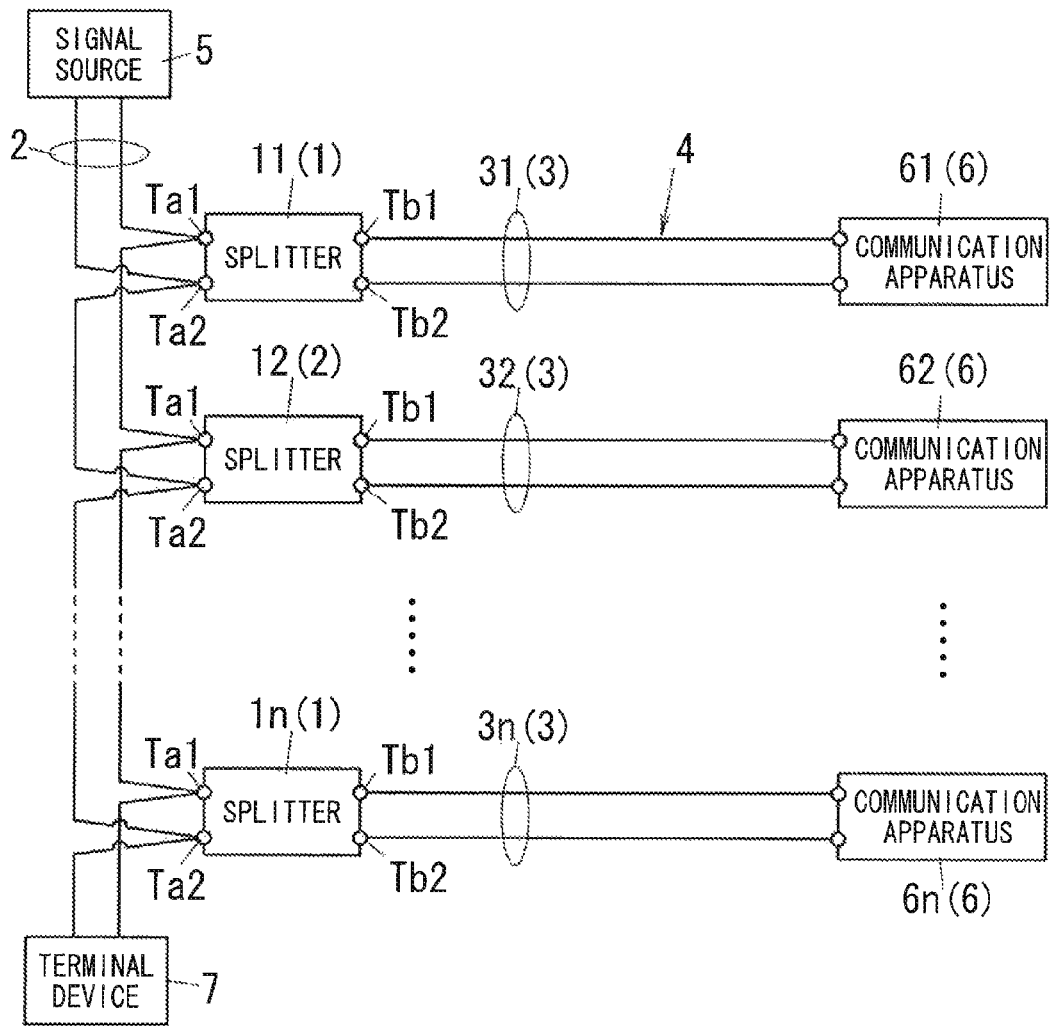
FIG. 2 is a system configuration diagram of a power distribution system that uses the splitter according to Embodiment 1.

The power distribution system has, as shown in FIG. 2, a power line 4 that includes a trunk line 2 and a plurality of (n sets, here) branch lines 31, 32, . . . , 3n that are branched from the trunk line 2, and distributes the AC power through respective branch lines 31, 32, . . . , 3n from the trunk line 2. At one end of the trunk line 2 is connected a signal source 5 that generates PLC communication signals, and PLC communication apparatuses (terminals) 61, 62, . . . , 6n are connected to ends of the branch lines 31, 32, . . . , 3n, respectively.

That is to say, a plurality of the communication apparatuses 61, 62, . . . , 6n are bus-wired with the power line 4. Here, the communication apparatus 61 is connected to the branch line 31, the communication apparatus 62 is connected to the branch line 32, and the communication apparatus 6n is connected to the branch line 3n. Furthermore, a terminal device 7 for impedance matching with the power line 4 in the frequency band of the communication signal is connected to the other end (terminal end) of the trunk line 2. Hereinafter, the plurality of branch lines 31, 32, . . . , 3n are collectively referred to as "branch line 3" unless distinguishing each individually. The plurality of communication apparatuses 61, 62, . . . , 6n are collectively referred to as "communication apparatus 6" unless distinguishing each individually. Note that in the power line 4, the trunk line 2 and the branch lines 3 are constituted by a two wire system in which two wires are paired. The communication apparatus 6 may be an apparatus such as a personal computer or a television receiver that includes a PLC modem for modulating/demodulating the PLC communication signal.

Here, in the frequency band of the communication signal, transmission impedance Zs of the signal source 5, impedance Zt of the terminal device 7, and input/output impedance Zr of each of communication apparatuses 6 are all set to be equal to the characteristic impedance Zo of the power line 4. That is to say, Zo=Zs=Zt=Zr for the frequency band of the communication signal.

Splitters 11, 12, . . . , 1n (hereinafter, simply referred to as "splitter 1" unless distinguishing each individually) of the present embodiment are each inserted between the trunk line 2 and the respective branch lines 31, 32, . . . , 3n of the power line 4 (branch points), as shown in FIG. 2. Here, the splitter 11 is inserted in the branch point from the trunk line 2 to the branch line 31, the splitter 12 is inserted in the branch point from the trunk line 2 to the branch line 32, and the splitter 1n is inserted in the branch point from the trunk line 2 to the branch line 3n.

Figure 1:
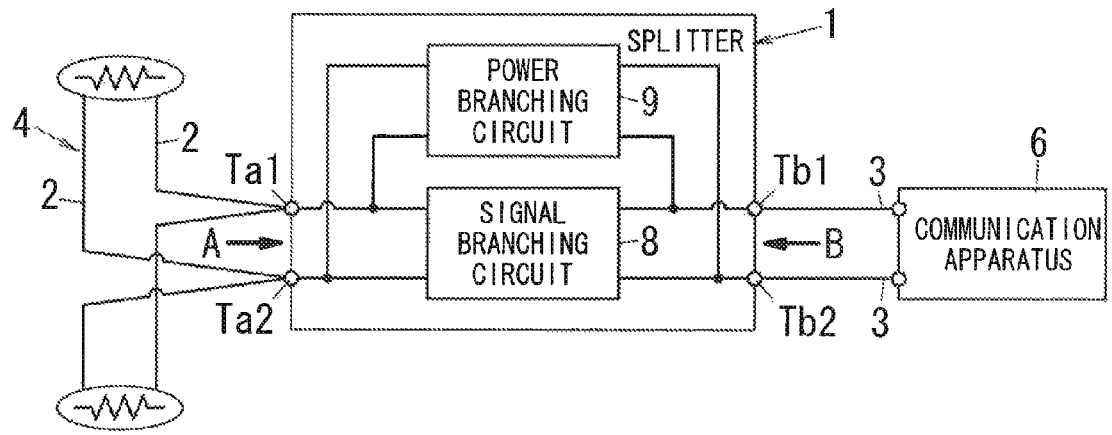
FIG. 1 is a block diagram of a splitter according to Embodiment 1.

As shown in FIG. 1, the splitter 1 is equipped with in one housing (not shown) trunk terminals Ta1 and Ta2 that are connected to the trunk line 2 and branch terminals Tb1 and Tb2 that are connected to the branch line 3. Here, in the power line 4, since both the trunk line 2 and the branch line 3 adopt the two wire system as described above, the trunk terminals Ta1 and Ta2 and the branch terminals Tb1 and Tb2 are each provided as a pair so as to be a set of two terminals. Furthermore, since the splitter 1 is connected such that the splitter 1 is inserted in a portion that is the branch point from the trunk line 2 to the branch line 3, two pairs of the trunk terminals Ta1 and Ta2 are provided corresponding to each of the upstream side (signal source 5 side) and the downstream side (terminal device 7 side) on the trunk line 2. In these two pairs of trunk terminals Ta1 and Ta2, the two trunk terminals Ta1 are connected and the two trunk terminal Ta2 are connected. However, since the upstream side and downstream side of the two trunk terminals Ta1 are electrically equivalent, and the upstream side and downstream side of the two trunk terminals Ta2 are electrically equivalent, they are represented as a pair of trunk terminals Ta1 and Ta2 in FIG. 1 without the upstream side and the downstream side of the trunk terminals Ta1 and Ta2 being distinguished.

The splitter 1 includes in the housing a signal branching circuit 8 that blocks the distributed power (AC power) and passes the PLC communication signal and a power branching circuit 9 that blocks the communication signal and passes the distributed power. The signal branching circuit 8 and the power branching circuit 9 are connected so as to be in parallel between the trunk terminals Ta1 and Ta2 and the branch terminals Tb1 and Tb2.

Accordingly, when distributed power in a state in which the communication signal is superimposed thereon passes from the trunk terminals Ta1 and Ta2 to the branch terminals Tb1 and Tb2 of the splitter 1, the communication signal and the distributed power are separated. The communication signal passes the signal branching circuit 8, and the distributed power passes the power branching circuit 9. In other words, the power branching circuit 9 separates and passes only the distributed power and blocks passing of the communication signal, and the signal branching circuit 8 separates and passes only the communication signal and blocks passing of the distributed power, and as a result the distributed power and the communication signal pass through different routes.

In the power branching circuit 9, the input/output impedance in the frequency band of the communication signal is set to be sufficiently higher than the impedance of the signal branching circuit 8 in the frequency band of the communication signal viewed from the trunk terminals Ta1 and Ta2 side ("A" side in FIG. 1). In the signal branching circuit 8, the impedance viewed from the trunk terminals Ta1 and Ta2 side is set to be higher than the impedance viewed from the branch terminals Tb1 and Tb2 side ("B" side in FIG. 1) in the frequency band of the communication signal, which will be described later in detail.

That is to say, the impedance of the power branching circuit 9 viewed from the trunk terminals Ta1 and Ta2 side and the impedance thereof viewed from the branch terminals Tb1 and Tb2 side are set to be sufficiently higher than the higher impedances among the impedance of the signal branching circuit 8 in the frequency band of the communication signal. Thus, the power branching circuit 9 can pass only the distributed power without passing the communication signal. In short, in the splitter 1, since the communication signal does not pass through the power branching circuit 9, the effect of the impedance of the power branching circuit 9 is small, and the impedance of the signal branching circuit 8 dominates in the frequency band of the communication signal. The specific configuration of the power branching circuit 9 will be described later. It is preferable that the input/output impedance of the power branching circuit 9 in the frequency band of the communication signal is set to be about five times of the impedance of the signal branching circuit 8 viewed from the trunk terminals Ta1 and Ta2 side.

Figure 3:
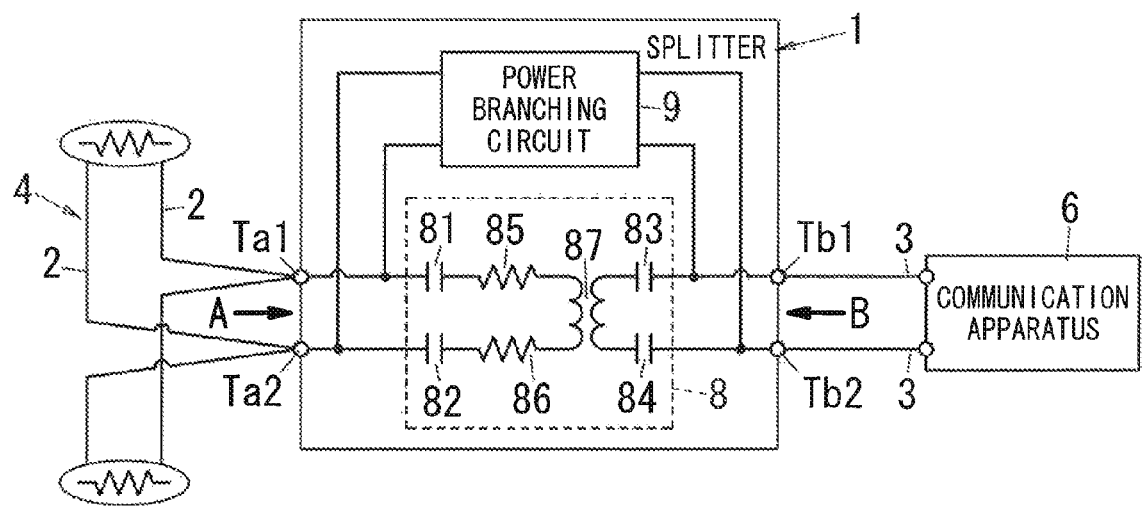
FIG. 3 is a circuit diagram of the splitter according to Embodiment 1.

The signal branching circuit 8 is configured by four capacitors 81 to 84, two resistors 85 and 86, and a transformer 87, as shown in FIG. 3. In the transformer 87, the trunk terminals Ta1 and Ta2 side is the primary winding and the branch terminals Tb1 and Tb2 side is the secondary winding. Capacitor 81 is inserted between one of the ends of the primary winding of the transformer 87 and the trunk terminal Ta1. Capacitor 82 is inserted between the other of the ends of the primary winding of the transformer 87 and the trunk terminal Ta2. Capacitor 83 is inserted between one of the ends of the secondary winding of the transformer 87 and the branch terminal Tb1. Capacitor 84 is inserted between the other of the ends of the secondary winding of the transformer 87 and the branch terminal Tb2. Resistor 85 is inserted between one of the ends of the primary winding of the transformer 87 and the capacitor 81. Resistor 86 is inserted between the other of the ends of the primary winding of the transformer 87 and the capacitor 82. Hereinafter, a resistance value r1 of the resistor 85 and a resistance value r2 of the resistor 86 are assumed to be R/2, and the winding turns ratio of the transformer 87 is assumed to be N:1 (=primary winding:secondary winding).

Here, in the signal branching circuit 8, the impedance Zb viewed from the branch terminals Tb1 and Tb2 side (hereinafter referred to as "branch side impedance") in the frequency band of the communication signal is set to match the characteristic impedance Zo of the power line 4 (that is, Zb=Zo). Meanwhile, in the signal branching circuit 8, the impedance Za viewed from the trunk terminals Ta1 and Ta2 side (hereinafter referred to as "trunk side impedance") in the frequency band of the communication signal is set to be higher than the characteristic impedance Zo of the power line 4 (that is, Za>Zo).

Incidentally, a loss Pz [dB] in the communication signal that occurs at the splitter 1 between the signal source 5 and the farthest communication apparatus 6n from the signal source 5 (hereinafter referred to as "maximum branch loss") is expressed as follows using a coupling loss Px [dB] and an insertion loss Py [dB] in each splitter 1.

$$Pz = Px + Py \times (n-1)$$

Note that n is the number of branches of the branch line 3 in the power line 4.

Here the coupling loss Px is a loss at the branch point (splitter 1) when the communication signal is branched from the trunk line 2 to the branch line 3, and corresponds to the electric power gain when the trunk line 2 is the input and the branch line 3 is the output. Meanwhile, the insertion loss Py is a loss that is caused when the communication signal passes the branch point (splitter 1) on the trunk line 2, and corresponds to the electric power gain when the upstream side of the trunk line 2 is the input and the downstream side thereof is the output. Similarly, the maximum branch loss Pz is a total loss caused by the splitters 1, which are equal in number of branches n that exist between the signal source 5 and the communication apparatus 6n, and corresponds to the sum of the total insertion loss (insertion loss/unit Py×(number of branches n−1)) and the coupling loss Px of one splitter 1.

In the splitter 1, the trunk side impedance Za of the signal branching circuit 8 in the frequency band of the communication signal is set such that the maximum branch loss Pz calculated as described above is in the allowable range determined by the communication signal intensity output from the signal source 5 and the communication signal receiving sensitivity of the communication apparatus 6. However, since the maximum branch loss Pz is a value in which only the loss at the splitter 1 is taken into consideration, the above allowable range is, in actuality, determined by taking into consideration of loss factors other than the splitter 1 such as a wiring length of the power line 4.

In other words, in the frequency band of the communication signal, the trunk side impedance Za of the signal branching circuit 8 is set to impedance that is higher than the characteristic impedance Zo and is set in accordance with the number of branches n such that the communication signal is distributed at an intensity that is equal to or higher than a specified value to all the branch lines 3 from the trunk line 2. That is to say, in a case where the branch lines 31, 32, ..., 3n are branched from the trunk line 2, the trunk side impedance Za is set such that the communication signal output from the signal source 5 can be distributed to the communication apparatus 6n that is connected to the farthest branch line 3n at an intensity that is equal to or higher than the receiving sensitivity of the communication apparatus 6. In short, the trunk side impedance Za of the signal branching circuit 8 is, basically, set to be the higher, the larger the allowable maximum number of branches n is.

Due to the trunk side impedance Za of the signal branching circuit 8 being set in this way, the splitter 1 can distribute electric power of the communication signal optimally to the plurality of branch lines 3 without yielding a branch line 3 in which the transmission line characteristics are extremely bad for the communication signal. As a result, as long as the number of the branch line 3 is within the number of branches n, the communication signal from the signal source 5 is distributed to all the plurality of branch lines 3 from the trunk line 2 at an intensity that is equal to or higher than the specified value, and communication becomes possible in all the communication apparatuses 6.

Next, a method in which a designer sets the trunk side impedance Za of the signal branching circuit 8 will be described by giving a specific example. Here, an example will be described in which the characteristic impedance Zo of the power line 4 is 75Ω and the maximum number of branches n allowable in the power line 4 is 10. Note that, since the input/output impedance of the power branching circuit 9 is sufficiently higher than the trunk side impedance Za in the frequency band of the communication signal, the input/output impedance of the power branching circuit 9 is assumed not to affect the impedance of the splitter 1 in total in the frequency band of the communication signal.

In this case, the designer assumes that the resistance value R/2 of each of resistors 85 and 86 in the signal branching circuit 8 is 172Ω and the winding turns ratio N:1 of the transformer 87 is 2.25:1 (=primary winding:secondary winding), and estimates that the trunk side impedance Za is Za≈724Ω. That is to say, since the trunk side impedance Za is expressed as $Za \approx R + Zo \times N^2$ using the resistance value R/2 of the resistors 85 and 86 and the winding turns ratio N:1 of the transformer 87, it is approximated that Za≈172×2+75×

$(2.25)^2 \approx 724\Omega$ under the above conditions. The designer takes the trunk side impedance Za($\approx 724\Omega$) approximated in this way as a candidate of the trunk side impedance Za.

Under the same condition, the insertion loss Py in the splitter 1 is expressed as Equation 1 using the transmission impedance Zs of the signal source 5, the impedance Zt of the terminal device 7, a voltage Vs of the communication signal output from the signal source 5, and a voltage Vm of the communication signal on the trunk line 2 that has passed the splitter 1.

$$Py = 10\log\frac{Vm^2/Zt}{(Vs/2)^2/Zs} \quad \text{[Equation 1]}$$

Here, since the impedance Zs is equal to the impedance Zt in the frequency band of the communication signal (Zo=Zs=Zt), the insertion loss Py is given as follows from the relationship between the voltage Vs of the communication signal output from the signal source 5 and the voltage Vm of the communication signal on the trunk line 2. That is, the insertion loss Py is approximated as Py≈−0.44 dB using the resistance value R/2, the winding turns ratio N:1, and the characteristic impedance Zo.

Similarly, the coupling loss Px is expressed as Equation 2 using the impedance Zs, the input/output impedance Zr of the communication apparatus 6, the voltage Vs of the communication signal output from the signal source 5, and a voltage Vr of the communication signal that is input to the communication apparatus 6 connected to the branch line 3 that is branched by the splitter 1.

$$Px = 10\log\frac{Vr^2/Zr}{(Vs/2)^2/Zs} \quad \text{(Equation 2)}$$

Here, since the impedance Zs is equal to the impedance Zr in the frequency band of the communication signal (Zo=Zs=Zr), the coupling loss Px is given as follows from the relationship between the voltage Vs of the communication signal output from the signal source 5 and the voltage Vr of the communication signal that is input to the communication apparatus 6. That is, the coupling loss Px is, similarly to the insertion loss Py, approximated as Px≈−13.09 dB using the resistance value R/2, the winding turns ratio N:1, and the characteristic impedance Zo.

The maximum branch loss Pz in this case is given as Pz=Px+Py×(n−1)=−13.09−0.44×(10−1)=−17.05 dB. The maximum branch loss Pz (=−17.05 dB) is approximately the minimum loss in the power distribution system in which the characteristic impedance of the power line 4 Zo=75Ω and the maximum number of branches n=10. The designer adopts the candidate (724Ω) of the trunk side impedance Za as the trunk side impedance Za, if this maximum branch loss Pz is in the allowable range that is determined by the intensity of the communication signal output from the signal source 5 and the communication signal receiving sensitivity of the communication apparatus 6. As a result, the designer fixes the trunk side impedance Za of the signal branching circuit 8, and adopts the circuit constants (R/2=172Ω, N:1=2.25:1) of the signal branching circuit 8 described above.

In the power line 4, due to the splitter 1 in which the same trunk side impedance Za is set as described above being inserted in each branch point, an arbitrary number of branches in a range in which the number of branches is not more than n=10 can be applied.

Figure 4:
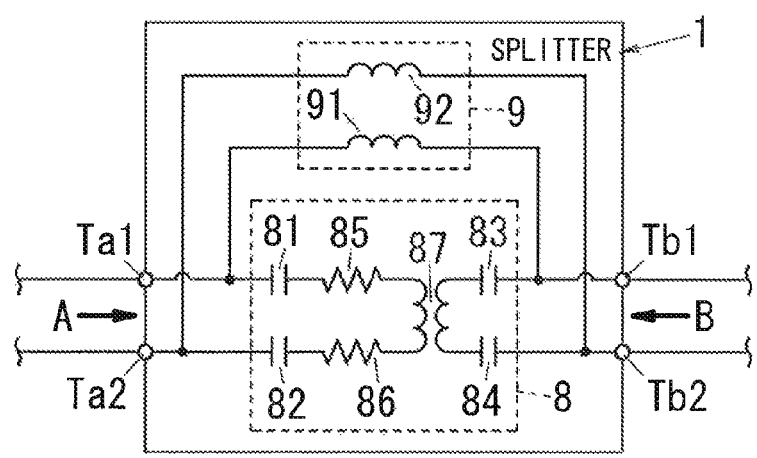
FIG. 4 is a circuit diagram of the splitter according to Embodiment 1.

Next, a specific example of the power branching circuit 9 will be described. The power branching circuit 9 is configured by differential mode (normal mode) choke coils 91 and 92, as shown in FIG. 4 for example. The choke coils 91 and 92 are inserted between the trunk terminals Ta1 and Ta2 and the branch terminals Tb1 and Tb2, respectively, and the inductance thereof is selected such that the distributed power is passed at a low loss and the input/output impedance of the power branching circuit 9 is sufficiently higher than the trunk side impedance Za.

In the example shown in FIG. 4, in the power branching circuit 9, the choke coils 91 and 92 each are inserted on the wires of the two-wire power line 4. That is to say, the choke coil 91 is inserted between one trunk terminal Ta1 and one branch terminal Tb1, and the choke coil 92 is inserted between the other trunk terminal Ta2 and the other branch terminal Tb2. Thus, the power branching circuit 9 can, due to having the choke coils 91 and 92 on respective wires of the power line 4, reliably block passing of the communication signal.

Figure 5:
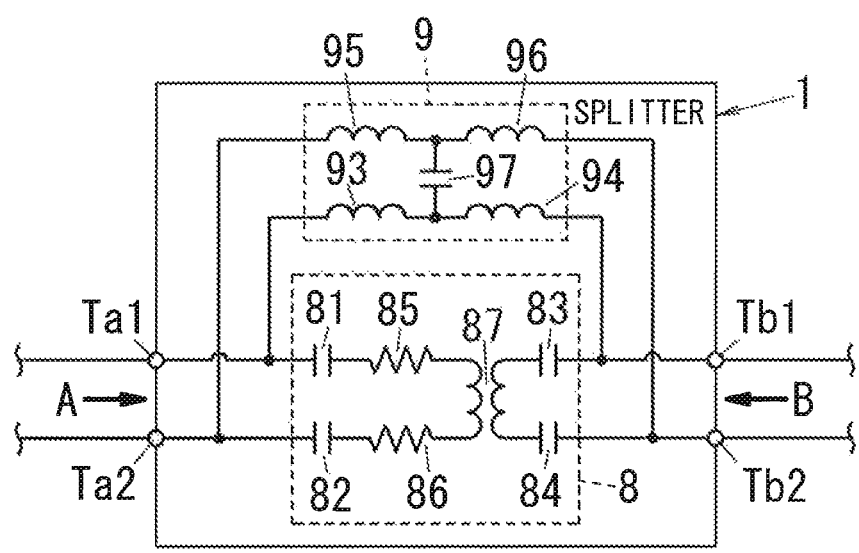
FIG. 5 is another circuit diagram of the splitter according to Embodiment 1.

Moreover, as another example, the power branching circuit 9 may be configured by a low-pass filter that has differential mode choke coils 93 to 96 and a capacitor 97, as shown in FIG. 5 for example. In this power branching circuit 9, the cutoff frequency of the low-pass filter is set, in accordance with the frequency band of the communication signal, so as to enable passing of the distributed power and reliably block passing of the communication signal. Similarly, in the power branching circuit 9, the circuit constants of the low-pass filter are selected such that the input/output impedance is sufficiently higher than the trunk side impedance Za of the signal branching circuit 8.

In the example in FIG. 5, the power branching circuit 9 has four choke coils 93 to 96, and these four choke coils 93 to 96 are inserted on the wires of the two wire system power line 4 such that two stages (a pair) of the choke coils are each serially inserted. That is, a pair of choke coils 93 and 94 are serially connected between one trunk terminal Ta1 and one branch terminal Tb1, and a pair of choke coils 95 and 96 are serially connected between the other trunk terminal Ta2 and the other branch terminal Tb2.

The capacitor 97 is connected between the connecting point of the pair of serially connected choke coils 93 and 94 and the connecting point of the pair of serially connected choke coils 95 and 96 such that the capacitor 97 spans the pair of trunk terminals Ta1 and Ta2. In other words, the power branching circuit 9 is configured by a low-pass filter that has the pair of differential mode choke coils 93 and 94 (95 and 96) that are serially connected between the trunk terminal Ta1 (Ta2) and the branch terminal Tb1 (Tb2), and the capacitor 97. The capacitor 97 is inserted between the pair of trunk terminals Ta1 and Ta2 at the connecting points of the pair of choke coils 93 and 94 and the pair of choke coils 95 and 96. Thus, the power branching circuit 9 can, due to being configured by the low-pass filter that uses the choke coils 93 to 96 and the capacitor 97, pass the distributed power at a low loss and block passing of the communication signal more reliably.

With the splitter 1 of the present embodiment described above, between the trunk terminals Ta1 and Ta2 and the branch terminals Tb1 and Tb2, the PLC communication signal and the distributed power can be separated and passed through the respective routes of the signal branching circuit 8 and the power branching circuit 9. In a case where a plurality of the branch lines 3 are branched from the trunk line 2 in the power line 4, due to the splitter 1 being provided at each branch point to the branch line 3, the impedance can be optimized in the frequency band of the communication signal, and reflection or loss of the communication signal at each branch point can be reduced.

That is to say, in this splitter 1, since impedance can be matched individually for each of the PLC communication signal and the distributed power at each branch point of the power line 4, reflection or loss can be reduced at each branch point not only for the distributed power but also for the communication signal. As the result, the splitter 1 has an advantage in that considerable lowering of the intensity of the communication signal at each branch point from the trunk line 2 to the branch line 3 in the power line 4 can be prevented and robust communication can be ensured.

Moreover, the splitters 1 of the present embodiment are provided at all the branch points from the trunk line 2 to the branch lines 3 regardless of whether or not the apparatus to be connected to the branch line 3 is the communication apparatus 6. Accordingly, by connecting the splitters 1 to all the branch points when a contractor of the power distribution system lays the power line 4, a user can connect the communication apparatus 6 to any of the branch lines 3 and there is no need to change the connecting point of the splitter 1 later.

Furthermore, in the signal branching circuit 8, since the branch side impedance Zb viewed from the branch terminals Tb1 and Tb2 matches the characteristic impedance Zo of the power line 4 in the frequency band of the communication signal, reflection of the communication signal does not occur at the connecting point to the branch line 3.

Similarly, in the signal branching circuit 8, the trunk side impedance Za viewed from the trunk terminals Ta1 and Ta2 is set to a higher impedance than the characteristic impedance Zo of the power line 4 in the frequency band of the communication signal. Moreover, the trunk side impedance Za is set in accordance with the number of branches from the trunk line 2 to the branch lines 3 (number of branches to the branch lines 3 in the power line 4) such that the communication signal can be distributed to all the plurality of branch lines 3 from the trunk line 2 at an intensity that is equal to or higher than a specified value. Thus, the splitter 1 of the present invention has an advantage in that the splitter 1 can distribute electric power of the communication signal appropriately to the plurality of branch lines 3 without yielding a branch line 3 in which the transmission line characteristics is considerably bad for the communication signal, and ensure robust communication.

Note that the splitter 1 of the present embodiment can also be used in a power distribution system introduced to collective housing or a factory, for example. For example, in the collective housing, the power line 4 is branched at every floor and then is branched at every dwelling unit before being branched inside each of the dwelling units. Even in a case where the power line 4 is branched in multi-stages, the splitter 1 can, due to being provided at each branch point of the power line 4, optimize the impedance in the frequency band of the communication signal and reduce reflection or loss of the communication signal at each branch point. Moreover, the splitter 1 can distribute electric power of the communication signal appropriately to the plurality of branch lines 3 without yielding a branch line 3 in which the transmission line characteristics is considerably bad for the communication signal, and can ensure robust communication.

Embodiment 2

A splitter 1 of the present embodiment differs from the splitter 1 of Embodiment 1 in that the splitter 1 is used in a DC power distribution system in which DC power is distributed to an interior of a residence as the distributed power. In the present embodiment, a PLC communication apparatus 6 (see FIG. 6) communicates by superimposing the communication signal on the DC power distributed through a power line 4 (see FIG. 6). Hereinafter, constituent elements similar to Embodiment 1 are provided the same reference sign, and redundant description thereof will be omitted appropriately.

The DC power distribution system of the present embodiment includes, as shown in FIG. 6, a DC power supply 110 for outputting DC power and a DC distribution board 120 for distributing the output of the DC power supply 110 to the interior of a residence. The DC power supply 110 includes an AC/DC converter 111 for converting an AC supplied by a commercial power supply (not shown) to a DC, a solar cell 112, and a secondary battery 113. The DC distribution board 120 includes a main switch 121 that is connected to the DC power supply 110 and a plurality of branch switches 122 that are connected to the secondary side of the main switch 121.

This DC power distribution system has a power line 4 that includes a plurality of intra-board trunk lines 21 and 22 connected to the secondary side of the main switch 121 and a plurality of interior trunk lines 23 and 24 branched from the intra-board trunk line 21 through the branch switches 122, in the DC distribution board 120. The interior trunk lines 23 and 24 are branched to a plurality of branch lines 31 to 34 (referred to as "branch line 3" collectively unless each of the same is specifically indicated) through the splitters 13 to 16. At the ends of the branch lines 3 are connected PLC communication apparatuses 61 to 64 (referred to as "communication apparatus 6" collectively unless each of the same is specifically indicated), respectively, and a terminal device 7 is connected at an opposing end relative to the branch switch 122 in each of the interior trunk lines 23 and 24.

Moreover, in the DC distribution board 120, a blocking filter 123 for preventing leaking of the communication signal is inserted in each of the intra-board trunk lines 21 and 22, and further a communication device 124 is connected to the intra-board trunk lines 21 and 22. In the example in FIG. 6, the communication device 124 is connected to an external network, and has a communication switch 125 and a matching circuit 126. Note that in the power line 4, the intra-board trunk lines 21 and 22, the interior trunk lines 23 and 24, and the branch lines 3 are constituted by a two wire system in which two wires are paired.

The splitters 1 of the present embodiment are provided, not only at branch points from the interior trunk lines 23 and 24 to the branch lines 3, but also at branch points from the intra-board trunk lines 21 and 22 to the interior trunk lines 23 and 24. Specifically, in the example in FIG. 6, the splitters 13 to 16 in which trunk terminals are connected to the interior trunk line 23 or 24 and branch terminals are connected to the branch line 3 are provided at the branch points to the branch lines 3 from the interior trunk lines 23 and 24 that are pulled out from the DC distribution board 120. In short, considering each of the interior trunk lines 23 and 24 as the trunk line 2 (see FIG. 2), the configuration from the interior trunk line 23 or 24 to the communication apparatuses 6 and the terminal device 7 is similar to that of the power distribution system of Embodiment 1.

Furthermore, in the example in FIG. 6, the splitters 11 and 12 in which the trunk terminals are connected to the respective branch switches 122 and the branch terminals are connected to the respective interior trunk lines 23 and 24 are provided at the load (interior trunk lines 23 and 24) side of the branch switches 122, in each of the branch points of the intra-board trunk line 21. That is, the interior trunk line 23 that is branched from the intra-board trunk line 21 by the splitter 11 is further branched to the branch lines 31 and 32 by the splitters 13 and 14, and the interior trunk line 24 that is branched from the intra-board trunk line 21 by the splitter 12 is further branched to the branch lines 33 and 34 by the splitters 15 and 16. In other words, for the intra-board trunk line 21, the splitter 11 and the splitters 13 and 14 are hierarchically connected, and the splitter 12 and the splitters 15 and 16 are hierarchically connected. Note that illustration of the trunk terminals and the branch terminals is omitted in FIG. 6.

Here, the trunk side impedance Za of the signal branching circuit 8 of each of the splitters 11 to 16 (referred to as "splitter 1" collectively unless each of the same is specifically indicated) in the frequency band of the communication signal is set as described below.

That is, in each splitter 1, the trunk side impedance Za is set such that the loss caused in the splitter 1 (maximum branch loss) is in an allowable range determined by a communication signal transmission intensity and receiving sensitivity of the communication apparatus 6, in a case where the communication apparatuses 6 that are located farthest from each other communicate therebetween. However, since the maximum branch loss is a value in which only the loss at the splitter 1 is taken into consideration, the above allowable range is determined, in actuality, taking into consideration loss factors other than the splitter 1, such as a wiring length of the power line 4.

In other words, in the frequency band of the communication signal, the trunk side impedance Za of the signal branching circuit 8 is set to an impedance that is higher than the characteristic impedance Zo and is set in accordance with the number of branches of the power line 4 such that the communication signal is distributed at an intensity equal to or higher than a specified value to all the branch lines 3. That is, in the splitters 11 and 12, the trunk side impedance Za viewed from the trunk terminal in the frequency band of the communication signal is set in accordance with the maximum number of branches of the interior trunk lines 23 and 24 that is allowed for one intra-board trunk line 21. In the splitters 13 to 16, the trunk side impedance Za viewed from the trunk terminal in the frequency band of the communication signal is set in accordance with the maximum number of branches of the branch lines 3 that is allowed for one interior trunk line 23 or 24.

According to the configuration of the present embodiment described above, also in the DC power distribution system in which the DC power is distributed as the distributed power to the interior of a residence, with the splitter 1, the PLC communication signal and the distributed power (DC power) can be separated and passed through the respective routes of the signal branching circuit 8 and the power branching circuit 9. That is to say, in this splitter 1, since impedance can be matched individually for each of the PLC communication signal and the distributed power at each branch point of the power line 4, reflection or loss can be reduced at each branch point not only for the distributed power but also for the communication signal. As a result, the splitter 1 has an advantage in that reflection or loss of the communication signal at each branch point of the power line 4 can be reduced and the quality of the PLC communication can be improved.

Moreover, in the signal branching circuit 8, in the frequency band of the communication signal, the trunk side impedance Za viewed from the trunk terminals is set such that the communication signal is distributed at an intensity equal to or higher than a specified value to all the plurality of branch lines 3 from the trunk line 2 in accordance with the number of branches of the power line 4. Thus, the splitter 1 of the present embodiment can distribute electric power of the communication signal appropriately to the plurality of branch lines 3 without yielding a branch line 3 in which the transmission line characteristics is considerably bad for the communication signal, and ensure robust communication.

Other configuration and functions are similar to Embodiment 1.

The invention claimed is:

1. A splitter used for power line communication in which a power line is used as a transmission line, the power line including a trunk line and a plurality of branch lines that are branched from the trunk line, and a communication signal in a predetermined frequency band is transmitted superimposed on distributed power, the splitter being inserted between the trunk line and each of the plurality of branch lines, and the splitter being provided with:
   a trunk terminal that is connected to the trunk line; and
   a branch terminal that is connected to a branch line,
   wherein the splitter comprises a signal branching circuit configured to block the distributed power and pass the communication signal and a power branching circuit configured to block the communication signal and pass the distributed power, parallely between the trunk terminal and the branch terminal,
   wherein in the signal branching circuit, in a frequency band of the communication signal, impedance viewed from the branch terminal side is set to match characteristic impedance of the power line, and impedance viewed from the trunk terminal side is set to impedance that is higher than the characteristic impedance of the power line and is set in accordance with a number of branches from the trunk line to the branch lines such that the communication signal is distributed at an intensity equal to or higher than a specified value from the trunk line to all the plurality of branch lines.

2. The splitter according to claim 1,
   wherein the power branching circuit is configured by differential mode choke coils.

3. The splitter according to claim 1,
   wherein a pair of trunk terminals and a pair of branch terminals are provided, and
   the power branching circuit is configured by a low-pass filter that includes a first pair of differential mode choke coils that are serially connected between one of the pair of trunk terminals and one of the pair of branch terminals and a second pair of differential mode choke coils that are serially connected between an other of the pair of trunk terminals and an other of the pair of branch terminals, and
   a capacitor that is connected between a connecting point of the first pair of choke coils and a connecting point of the second pair of choke coils.

* * * * *